United States Patent
Fargo et al.

(10) Patent No.: US 10,246,299 B2
(45) Date of Patent: Apr. 2, 2019

(54) SYSTEM INCLUDING STRUCTURALLY INDEPENDENT ELEVATOR MACHINE GUIDERAIL MOUNTS

(71) Applicant: Otis Elevator Company, Farmington, CT (US)

(72) Inventors: Richard N. Fargo, Plainville, CT (US); Robert Wheeler, Bloomfield, CT (US)

(73) Assignee: Otis Elevator Company, Farmington, CT (US)

( * ) Notice: Subject to any disclaimer, the term of this patent is extended or adjusted under 35 U.S.C. 154(b) by 606 days.

(21) Appl. No.: 14/440,800

(22) PCT Filed: Nov. 5, 2012

(86) PCT No.: PCT/US2012/063562
§ 371 (c)(1),
(2) Date: May 5, 2015

(87) PCT Pub. No.: WO2014/070208
PCT Pub. Date: May 8, 2014

(65) Prior Publication Data
US 2015/0291395 A1    Oct. 15, 2015

(51) Int. Cl.
B66B 11/00    (2006.01)
B66B 7/02    (2006.01)
F16F 15/04    (2006.01)

(52) U.S. Cl.
CPC .......... B66B 11/0045 (2013.01); B66B 7/023 (2013.01); B66B 7/027 (2013.01); F16F 15/04 (2013.01)

(58) Field of Classification Search
CPC ..... B66B 11/0045; B66B 7/027; B66B 7/023; F16F 15/04
See application file for complete search history.

(56) References Cited

U.S. PATENT DOCUMENTS

| | | | |
|---|---|---|---|
| 3,946,859 A | 3/1976 | Jeffrey et al. | |
| 6,446,762 B1 * | 9/2002 | St. Pierre | B66B 7/02 187/406 |
| 6,598,707 B2 | 7/2003 | Nakagaki et al. | |
| 6,626,266 B2 | 9/2003 | Hmaguchi | |
| 6,655,500 B2 | 12/2003 | Orrman et al. | |

(Continued)

FOREIGN PATENT DOCUMENTS

| | | |
|---|---|---|
| EP | 1053969 A2 | 11/2000 |
| JP | 10087224 | 4/1998 |

(Continued)

OTHER PUBLICATIONS

Office action for CN201280076876.3 dated Aug. 2, 2016.
EP search report for EP12887818.8 dated Sep. 28, 2016.

*Primary Examiner* — Diem M Tran
(74) *Attorney, Agent, or Firm* — O'Shea Getz P.C.

(57) ABSTRACT

An elevator system is provided that includes a car guiderail, a first counterweight guiderail, a second counterweight guiderail, an elevator machine, a first guiderail mount and a second guiderail mount. The elevator machine includes a frame, a motor, a brake and a sheave. The first guiderail mount structurally connects the frame to the first and the second counterweight guiderails. The second guiderail mount structurally connects the frame to the car guiderail independent of the first guiderail mount.

22 Claims, 8 Drawing Sheets

(56) References Cited

U.S. PATENT DOCUMENTS

| | | |
|---|---|---|
| 6,742,628 B2 | 6/2004 | Bauer |
| 6,848,543 B2 | 2/2005 | Adifon et al. |
| 6,851,519 B2 | 2/2005 | Ach et al. |
| 6,991,069 B1 | 1/2006 | Ach |
| 7,025,177 B1 | 4/2006 | Yang et al. |
| 7,178,636 B2 | 2/2007 | Kato et al. |
| 7,267,200 B2 | 9/2007 | Orrman |
| 7,383,924 B2 * | 6/2008 | Izumi .................. B66B 11/008 187/250 |
| 7,543,685 B2 | 6/2009 | Ach et al. |
| 7,549,514 B2 | 6/2009 | Heggli et al. |
| 7,624,848 B2 | 12/2009 | Fischer |
| 7,681,692 B2 * | 3/2010 | Fischer .................. B66B 7/021 187/254 |
| 7,757,818 B2 | 7/2010 | Fischer |
| 2004/0108170 A1 | 6/2004 | Kocher et al. |
| 2007/0017003 A1 | 7/2007 | Kazuhiro et al. |
| 2007/0170003 A1 | 7/2007 | Izumi et al. |
| 2011/0022655 A1 | 9/2011 | Ericson et al. |
| 2011/0226557 A1 | 9/2011 | Ericson et al. |

FOREIGN PATENT DOCUMENTS

| | | |
|---|---|---|
| JP | 2004231304 | 8/2004 |
| KR | 100221774 | 9/1999 |
| KR | 100221774 B1 | 9/1999 |

\* cited by examiner

SYSTEM INCLUDING STRUCTURALLY INDEPENDENT ELEVATOR MACHINE GUIDERAIL MOUNTS

This application is entitled to the benefit of, and incorporates by reference essential subject matter disclosed in PCT Application No. PCT/US2012/063562 filed on Nov. 5, 2012.

BACKGROUND OF THE INVENTION

1. Technical Field

This disclosure relates generally to an elevator and, more particularly, to mounts for an elevator machine 2. Background Information A typical elevator includes an elevator machine that moves an elevator car and a counterweight vertically within a building hoistway. The car travels vertically along car guiderails. The counterweight travels vertically along counterweight guiderails.

The elevator machine typically includes a machine sheave that is connected to a motor and a brake. The elevator machine may be mounted on a mounting platform. The mounting platform may be mounted to the counterweight guiderails as well as an adjacent one of the car guiderails. All loads transferred between the elevator machine and the guiderails therefore must travel through the mounting platform.

In some applications, the mounting platform may be configured as a plate type structure. Such a plate type structure, however, may be relatively heavy and therefore difficult to install. In other applications, the mounting platform may include a complex structure of interconnected trusses. Such a complex structure, however, may be relatively time consuming and costly to manufacture.

SUMMARY OF THE DISCLOSURE

According to an aspect of the invention, an elevator system is provided that includes a car guiderail, a first counterweight guiderail, a second counterweight guiderail, an elevator machine, a first guiderail mount and a second guiderail mount. The elevator machine includes a frame, a motor, a brake and a sheave. The first guiderail mount structurally connects the frame to the first and the second counterweight guiderails. The second guiderail mount structurally connects the frame to the car guiderail independent of the first guiderail mount.

According to another aspect of the invention, a system is provided for an elevator having a car guiderail, a first counterweight guiderail and a second counterweight guiderail. The system includes an elevator machine, a first guiderail mount and a second guiderail mount. The elevator machine includes a frame, a motor, a brake and a sheave. The first guiderail mount is connected to a first side of the frame, and adapted to structurally connect the frame to the first and the second counterweight guiderails. The second guiderail mount is connected to a second side of the frame, and adapted to structurally connect the frame to the car guiderail independent of the first guiderail mount.

According to another aspect of the invention, another elevator system is provided that includes a car guiderail, a plurality of counterweight guiderails, an elevator machine, a first guiderail mount, and a second guiderail mount. The elevator machine includes a frame, a motor, a brake and a sheave. The first guiderail mount connects the frame to the counterweight guiderails. The second guiderail mount connects the frame to the car guiderail, and is physically isolated from the first guiderail mount.

According to another aspect of the invention, a linkage is provided for connecting a rail to an elevator car guiderail. The linkage includes an outer shell (e.g., metallic outer shell) and an isolation sleeve (e.g., a polymeric isolation sleeve). The isolation sleeve is housed and supported within the outer shell. The isolation sleeve is adapted to at least partially reduce transmission of vibrations between the rail and the car guiderail. The isolation sleeve includes a (e.g., T-shaped) first aperture and a (e.g., T-shaped) second aperture. The first aperture is adapted to receive an end of the rail, and the second aperture is adapted to receive an end of the guiderail.

Alternatively or in addition to this or other aspects of the invention, the first guiderail mount may be connected to a first side of the frame, and the second guiderail mount may be connected to a second side of the frame.

Alternatively or in addition to this or other aspects of the invention, the frame may extend between and separate the first and the second guiderail mounts.

Alternatively or in addition to this or other aspects of the invention, the first guiderail mount may include a beam extending laterally between a first beam end and a second beam end. The beam may be connected to the first counterweight guiderail at the first beam end. The beam may be connected to the second counterweight guiderail at the second beam end. The beam may be connected to the frame between the first and the second beam ends.

Alternatively or in addition to this or other aspects of the invention, the beam may include a bridge segment extending laterally between a first extension segment and a second extension segment. The first extension segment may be arranged at the first beam end and may connect the first counterweight guiderail to the bridge segment. The second extension segment may be arranged at the second beam end and may connect the second counterweight guiderail to the bridge segment.

Alternatively or in addition to this or other aspects of the invention, the beam may be configured as a unitary body. Alternatively, the beam may include a plurality of segments and/or elements that are, for example, mechanically or otherwise fastened together.

Alternatively or in addition to this or other aspects of the invention, the first guiderail mount may include a first mounting bracket and a second mounting bracket. The first mounting bracket may connect the first counterweight guiderail to the first beam end. The second mounting bracket may connect the second counterweight guiderail to the second beam end.

Alternatively or in addition to this or other aspects of the invention, the first guiderail mount may include one or more dampers disposed between the beam and the frame. Alternatively or additionally, the second guiderail mount may include one or more dampers disposed between the car guiderail and the frame.

Alternatively or in addition to this or other aspects of the invention, one or more tension member (e.g., belt) terminations may be connected to the beam. The terminations may be arranged laterally between the first and the second beam ends.

Alternatively or in addition to this or other aspects of the invention, the second guiderail mount may include a mount cross member and a mount leg. The mount cross member may extend laterally between a first cross member end that is connected to a first end of the frame, and a second cross member end that is connected to a second end of the frame.

The mount leg may extend vertically between a first leg end that is connected to the car guiderail, and a second leg end that is connected to the mount cross member laterally between the first and the second cross member ends.

Alternatively or in addition to this or other aspects of the invention, the frame may extend laterally between a first frame end and a second frame end. The second guiderail mount may include a first mount leg and a second mount leg. The first mount leg may extend vertically and/or laterally away from the car guiderail to a first mount leg end, which is connected to the first frame end. The second mount leg may extend vertically and/or laterally away from the car guiderail to a second mount leg end, which is connected to the second frame end.

Alternatively or in addition to this or other aspects of the invention, the frame may house a first sheave bearing at the first frame end and/or a second sheave bearing at the second frame end. The first mount leg may transfer a vertical load between the car guiderail and the first sheave bearing. The second mount leg may transfer a vertical load between the car guiderail and the second sheave bearing.

Alternatively or in addition to this or other aspects of the invention, the second guiderail mount may include a tab that connects the car guiderail to the frame.

Alternatively or in addition to this or other aspects of the invention, the second guiderail mount may include a rail that connects an end of the car guiderail to the frame.

Alternatively or in addition to this or other aspects of the invention, the second guiderail mount may include a linkage that connects an end of the rail to the end of the car guiderail. The linkage may at least partially reduce or prevent transmission of vibrations between the rail and the car guiderail.

Alternatively or in addition to this or other aspects of the invention, the linkage includes an outer shell and an isolation sleeve. The outer shell may house and/or support the isolation sleeve. The isolation sleeve may include a first aperture that receives the end of the rail, and/or a second aperture that receives the end of the car guiderail.

Alternatively or in addition to this or other aspects of the invention, the frame may extend laterally between a first frame end and a second frame end. The brake may be connected to the first frame end. The motor may be connected to the second frame end. The sheave may extend laterally through the frame between the motor and the brake.

Alternatively or in addition to this or other aspects of the invention, a lateral center of the sheave may be laterally offset from the car guiderail. Alternatively, the lateral center of the sheave may be laterally aligned with the car guiderail.

Alternatively or in addition to this or other aspects of the invention, the sheave may include one or more tension member grooves. The sheave may be configured as a unitary body. Alternatively, the sheave may be configured from a plurality of discrete sheave segments.

The foregoing features and the operation of the invention will become more apparent in light of the following description and the accompanying drawings.

DETAILED DESCRIPTION OF THE INVENTION

Figure 1:
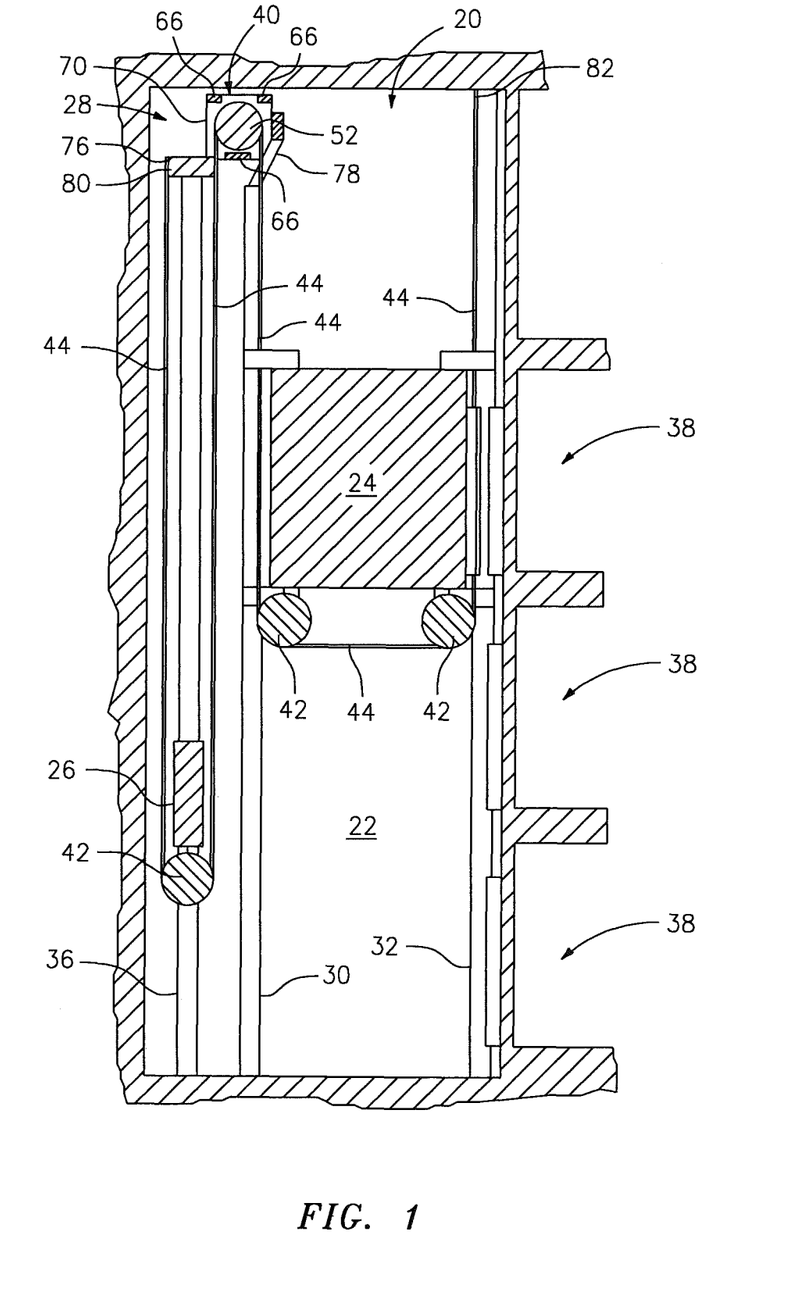
FIG. 1 is a diagrammatic illustration of a traction elevator arranged within an elevator hoistway.

FIG. 1 illustrates a traction elevator 20 arranged within a building hoistway 22. The elevator 20 includes an elevator car 24, an elevator counterweight 26, an elevator drive system 28, one or more car guiderails 30 and 32, and a plurality of counterweight guiderails 34 and 36 (see also FIG. 3). The car 24 travels vertically within the hoistway 22 along the car guiderails 30 and 32 between elevator landings 38. The counterweight 26 travels vertically within the hoistway 22 along the counterweight guiderails 34 and 36. The drive system 28 selectively moves the car 24 and the counterweight 26 along the guiderails, and includes an elevator machine 40, one or more idler sheaves 42, and one or more tension members 44 (e.g., ropes, belts, etc.).

Figure 2:
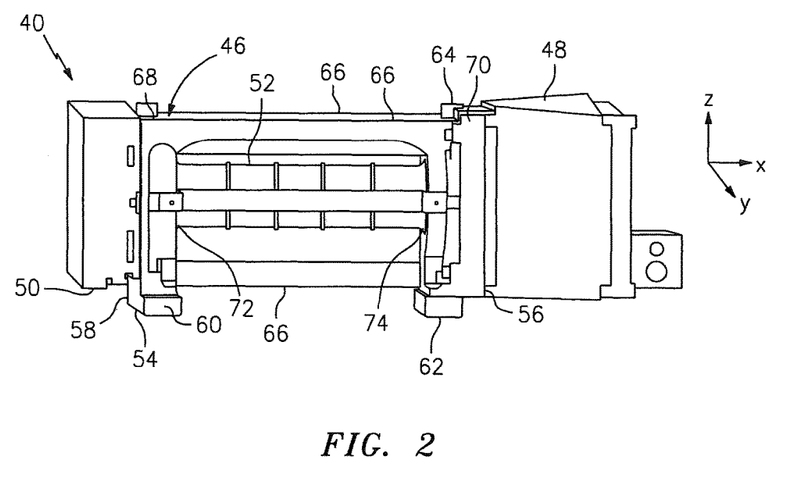
FIG. 2 is a perspective illustration of an elevator machine

Referring to FIG. 2, the machine 40 includes a frame 46, a motor 48, a brake 50 and a machine sheave 52. The frame 46 extends laterally along an x-axis between a first frame end 54 and a second frame end 56. The frame 46 extends depthwise along a y-axis between a vertical first frame side 58 and a vertical second frame side 60. The frame 46 extends vertically along a z-axis between a horizontal first (e.g., bottom) frame side 62 and a horizontal second (e.g., top) frame side 64. The frame 46 embodiment of FIG. 2 includes one or more cross members 66 that laterally connect a first endplate 68 and a second endplate 70 together. The first endplate 68 may house a first sheave bearing (not shown) at (e.g., adjacent or proximate to) the first frame end 54. The second endplate 70 may house a second sheave bearing (not shown) at the second frame end 56. The brake 50 is connected to the first endplate 68 at the first frame end 54.

The motor 48 is connected to the second endplate 70 at the second frame end 56. The machine sheave 52 extends laterally through the frame 46 between the motor 48 and the brake 50. A first end 72 of the machine sheave 52 is connected to the brake 50, and rotatably supported by the first sheave bearing at the first frame end 54. A second end 74 of the machine sheave 52 is connected to the motor 48, and rotatably supported by the second sheave bearing at the second frame end 56.

Referring to FIG. 1, the machine 40 is connected to the counterweight guiderails 34 and 36 and the car guiderail 30 respectively by way of first and second guiderail mounts 76 and 78, which are described below in further detail. One of the idler sheaves 42 may be rotatably connected to the counterweight 26. One or more of the idler sheaves 42 may be rotatably connected to the car 24. Ends of the tension members 44 are connected to respective tension member terminations 80 and 82. The tension members 44 are engaged with (e.g., serpentine around) the machine sheave 52 and the idler sheaves 42, which enables the motor 48 and the brake 50 to move (e.g., lift or lower) the car 24 and the counterweight 26 vertically within the hoistway 22 by selectively rotating the machine sheave 52.

Figure 3:
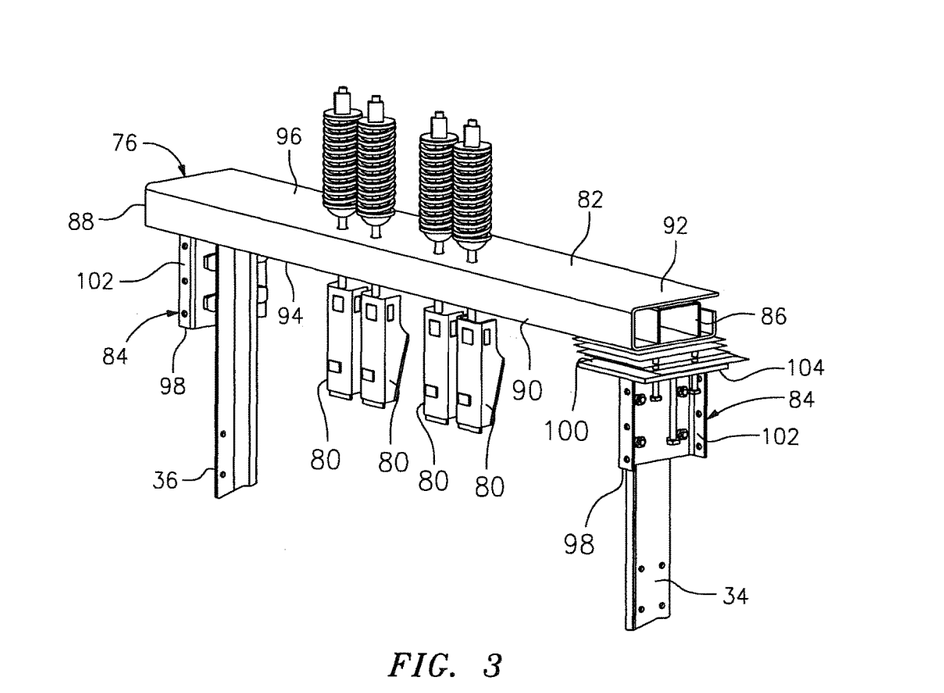
FIG. 3 is a perspective illustration of a first guiderail mount connected to counterweight guiderails.

Referring to FIG. 3, the first guiderail mount 76 includes a beam 82 and a plurality of mounting brackets 84. The beam 82 extends laterally between a first beam end 86 and a second beam end 88. The beam 82 extends depthwise between vertical first beam side 90 and a vertical second beam side 92. The beam 82 extends vertically between a horizontal first (e.g., bottom) beam side 94 and a horizontal second (e.g., top) beam side 96. In the embodiment of FIG. 3, the beam 82 is configured as a length of rectangular tubing with, for example, an inner reinforcement core (see also FIGS. 4 and 5). The present invention, however, is not limited to any particular beam configuration.

Each of the mounting brackets 84 extends vertically between a first (e.g., bottom) bracket end 98 and a second (e.g., top) bracket end 100. The mounting bracket 84 embodiment of FIG. 3 includes a guiderail mount 102 and a beam mount 104. The guiderail mount 102 is configured as a length of C-channel that extends from the first bracket end 98 to the beam mount 104. The beam mount 104 is configured as a plate, and is arranged at the second bracket end 100. The present invention, however, is not limited to any particular mounting bracket configuration.

Figure 4:
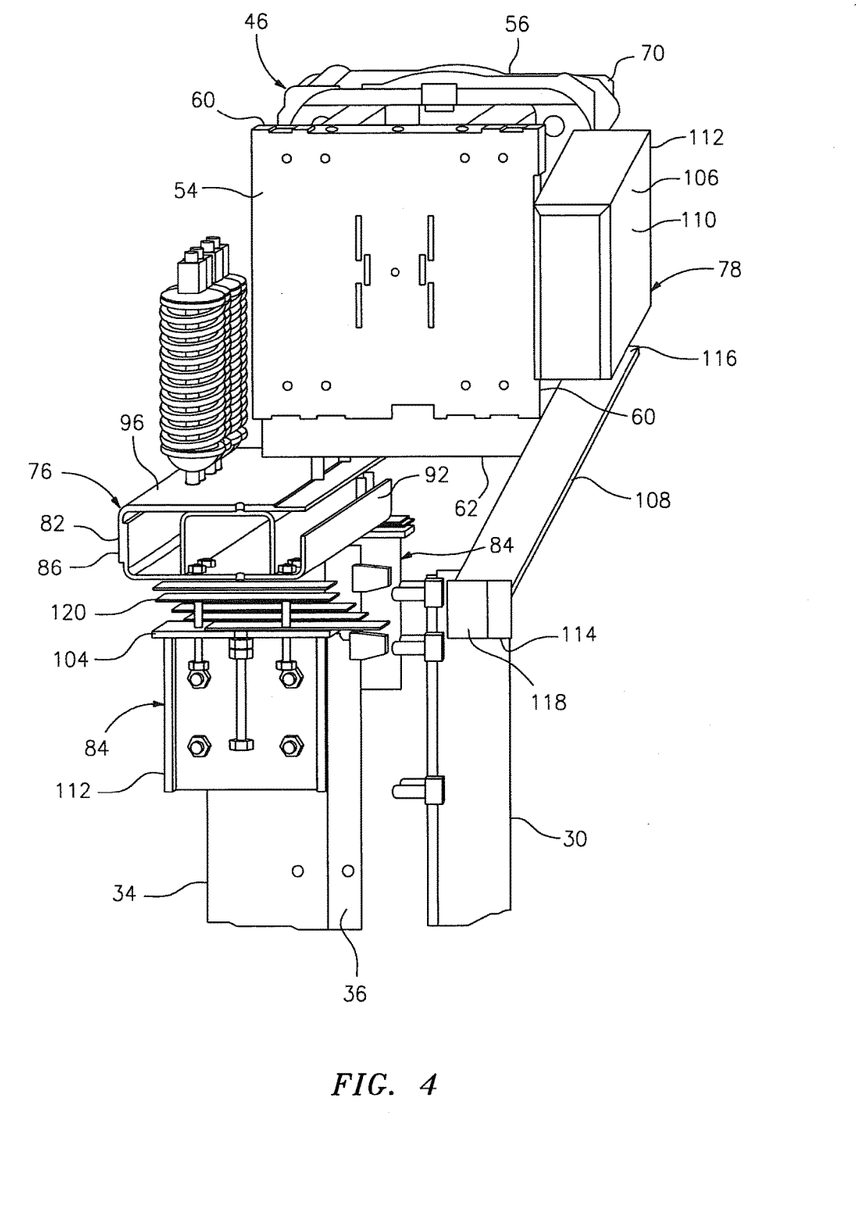
FIG. 4 is a perspective illustration of a first guiderail mount connecting an elevator machine to counterweight guiderails, and a second guiderail mount independently connecting the elevator machine to a car guiderail.
Figure 5:
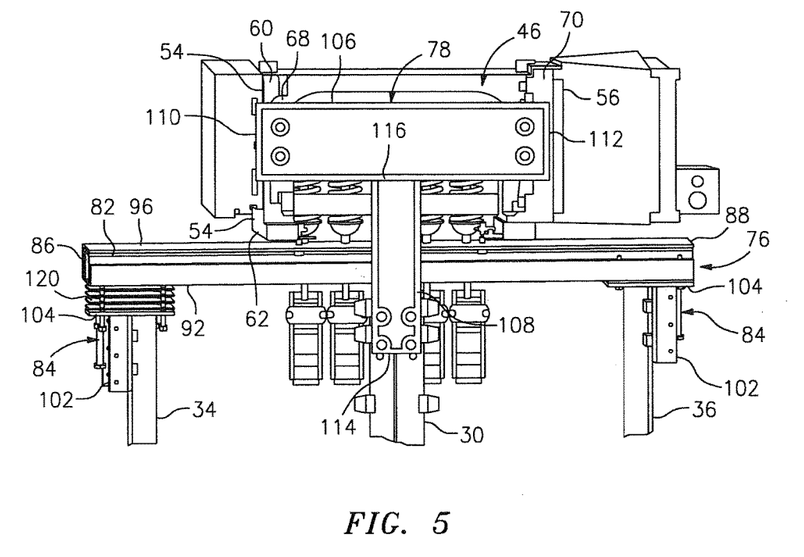
FIG. 5 is another perspective illustration of the first guiderail mount, the second guiderail mount, the elevator machine and the guiderails illustrated in FIG. 4.

The mounting brackets 84 respectively connect the beam 82 to the counterweight guiderails 34 and 36 at, for example, vertical top ends of the guiderails 34 and 36. The guiderail mounts 102, for example, are respectively connected (e.g., mechanically fastened, welded or otherwise adhered) to vertical sides of the counterweight guiderails 34 and 36. The beam side 94 directly or indirectly engages the beam mounts 104, which are respectively connected to the beam 82 at the first and second beam ends 86 and 88. Referring to FIGS. 4 and 5, the frame side 62 directly or indirectly engages the beam side 96. The frame 46 is arranged, for example, centrally between first beam end 86 and the second beam end 88. The frame 46 is connected to the beam 82, for example, proximate to the beam side 92. The first guiderail mount 76 therefore structurally connects the frame 46 to the counterweight guiderails 34 and 36. In this manner, the first guiderail mount 76 provides a first load path between the frame 46, at the frame side 62, and the counterweight guiderails 34 and 36.

The second guiderail mount 78 embodiment of FIGS. 4 and 5 includes a mount cross member 106 and a mount leg 108. The cross member 106 extends laterally between a first cross member end 110 and a second cross member end 112. The mount leg 108 extends vertically and, for example, depthwise between a first leg end 114 and a second leg end 116. The second leg end 116 is connected to the mount cross member 106, for example, centrally between the first cross member end 110 and the second cross member end 112.

The first leg end 114 is connected to the car guiderail 30 at, for example, a vertical top end of the guiderail 30 by way of a mounting bracket 118 (e.g., a mounting block). The first cross member end 110 is connected to the first endplate 68 at the first frame end 54. The second cross member end 112 is connected to the second endplate 70 at the second frame end 56. The second guiderail mount 78 therefore structurally connects the frame 46 to the car guiderail 30 independent of the first guiderail mount 76. In this manner, the second guiderail mount 78 provides a second load path between the frame 46, at the frame side 60, and the car guiderail 30, where the second load path is independent and different than the first load path.

The structural independence of the first and the second guiderail mounts 76 and 78 enable each mount to be installed separately. A technician therefore need not manipulate as much weight installing the first and the second guiderail mounts 76 and 78 as compared to installing the relatively heavy plate type mounting platform structure described above. The structural independence and simplicity of the first and the second guiderail mounts 76 and 78 may also enable the mounts to be manufactured in less time and/or at a reduced cost as compared to the complex mounting platform structure described above.

In some embodiments, for example as illustrated in FIG. 3, the beam 82 may be adapted to support the tension member terminations 80. The tension member terminations 80 are arranged, for example, centrally between the first beam end 86 and the second beam end 88. The tension member terminations 80 are connected to the beam 82, for example, proximate to the beam side 90.

In some embodiments, for example as illustrated in FIGS. 4 and 5, the beam 82 may be isolated from one or more of the guiderails 30, 34 and/or 36. A damper 120 (e.g., an elastomer or rubber isolation pad) may be arranged, for example, between the beam mount 104 and the beam side 94 at the first beam end 86. In another example, one or more dampers (e.g., bushings) may be arranged between the beam 82 and the frame 46. In still another example, one or more dampers (e.g., bushings) may be arranged between the cross member 106 and the frame 46.

Figure 6:
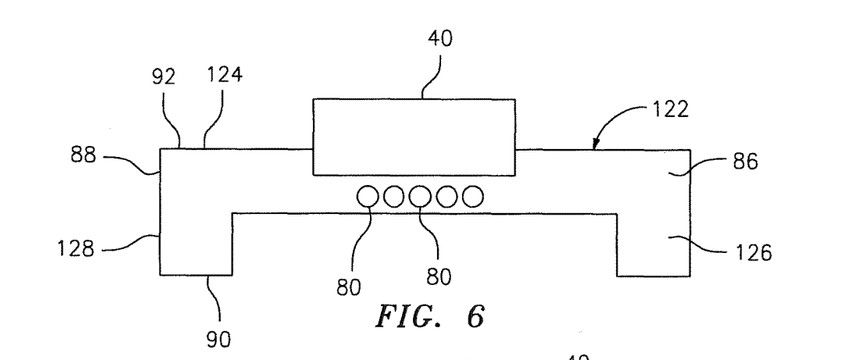
FIG. 6 is a top view diagrammatic illustration of a first guiderail mount.
Figure 7:
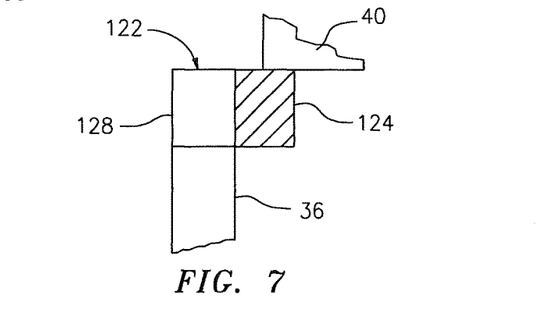
FIG. 7 is a side cross-sectional illustration of the first guiderail mount illustrated in FIG. 6.

FIGS. 6 and 7 illustrate an alternate embodiment beam 122. In contrast to the beam 82 illustrated in FIG. 3, the beam 122 includes a plurality of segments such as a bridge segment 124, a first extension segment 126 and a second extension segment 128. The bridge segment 124 extends laterally between the first beam end 86 and the second beam end 88. The first and the second extension segments 126 and 128 extend depthwise from the bridge segment 124 to the beam side 90. The first extension segment 126 connects the first counterweight guiderail 34 to the bridge segment 124. The second extension segment 128 connects the second counterweight guiderail 36 to the bridge segment 124. The beam 122 may be configured as a unitary body as illustrated in FIGS. 6 and 7. Alternatively, the extension segments 126 and 128 may be mechanically or otherwise fastened to the bridge segment 124.

Figure 8:
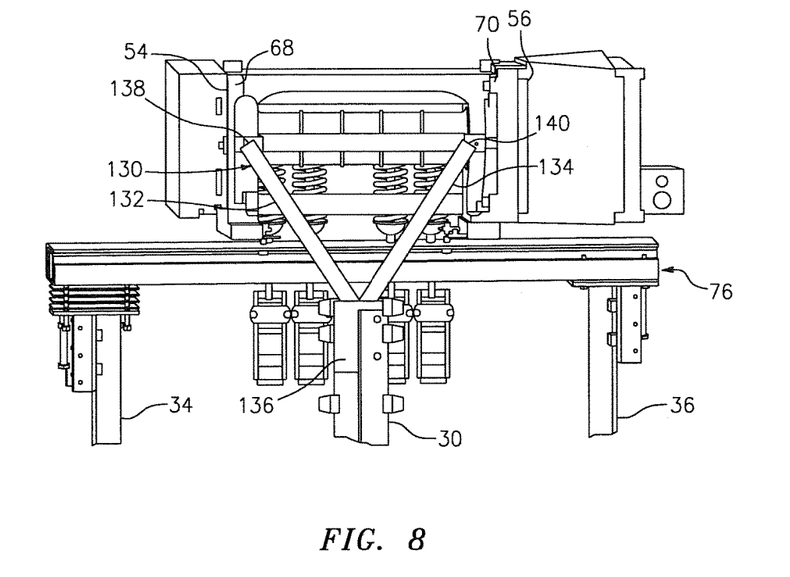
FIG. 8 is another perspective illustration of a first guiderail mount connecting an elevator machine to counterweight guiderails, and a second guiderail mount independently connecting the elevator machine to a car guiderail.

FIG. 8 illustrates an alternative embodiment second guiderail mount 130. In contrast to the second guiderail mount 78 illustrated in FIG. 5, the second guiderail mount 130 includes a first mount leg 132, a second mount leg 134 and a mounting bracket 136. The first mount leg 132 extends vertically out from the mounting bracket 136 and away from the car guiderail 30 to a distal first mount leg end 138, which is connected to the first endplate 68 at the first frame end 54. The second mount leg 134 extends vertically out from the mounting bracket 136 and away from the car guiderail 30 to a distal second mount leg end 140, which is connected to the second endplate 70 at the second frame end 56. The mounting bracket 136 may be configured similar to the mounting brackets 84 illustrated in FIG. 3, and is connected to the car guiderail 30 at, for example, the vertical top end of the guiderail 30. In this manner, the first mount leg 132 may transfer a vertical load from the first sheave bearing housed in the first endplate 68 to the car guiderail 30. Similarly, the second mount leg 134 may transfer a vertical load from the second sheave bearing housed in the second endplate 70 to the car guiderail 30.

Figure 9:
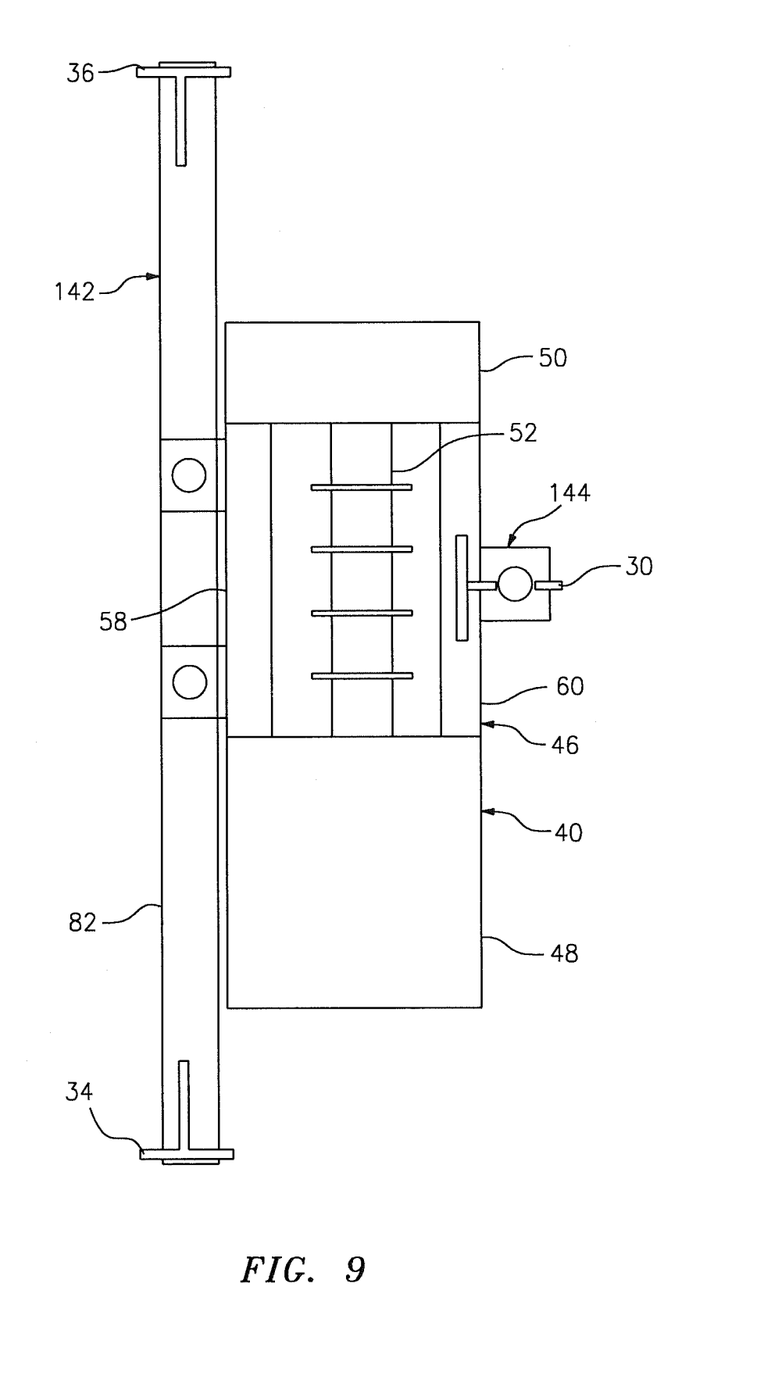
FIG. 9 is a diagrammatic illustration of a first guiderail mount connecting an elevator machine to counterweight guiderails, and a second guiderail mount independently connecting the elevator machine to a car guiderail.

FIG. 9 illustrates an alternate embodiment first guiderail mount 142 and an alternate embodiment second guiderail mount 144. In contrast to the first guiderail mount 76 illustrated in FIGS. 4 and 5, the beam 82 of the first guiderail mount 142 is connected to the frame side 58. In contrast to the second guiderail mount 78 illustrated in FIGS. 4 and 5, the second guiderail mount 144 includes one or more fasteners that directly connect the car guiderail 30 to the frame side 60. The frame 46 therefore extends depthwise between and separates the first and the second guiderail mounts 142 and 144. In some embodiments, the second guiderail mount 144 may include one or more dampers to isolate vibrations between the elevator machine 40 and the car guiderail 30.

Figure 10:
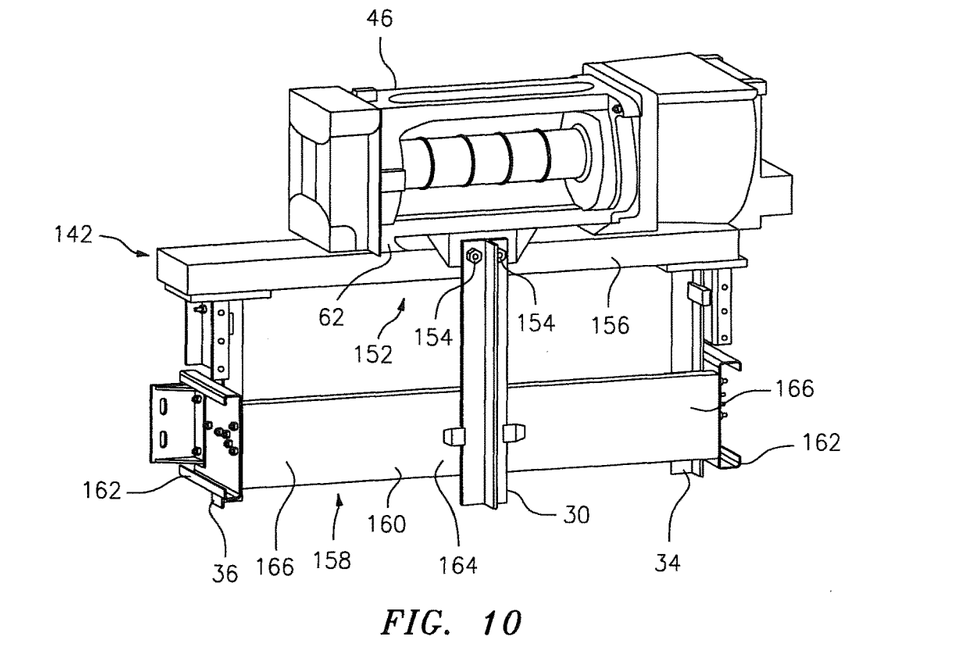
FIG. 10 is another diagrammatic illustration of a first guiderail mount connecting an elevator machine to counterweight guiderails, and a second guiderail mount independently connecting the elevator machine to a car guiderail.
Figure 11:
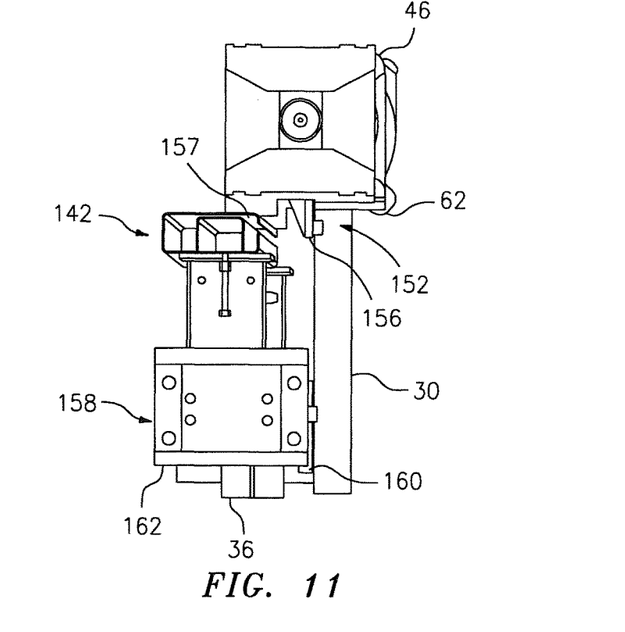
FIG. 11 is another diagrammatic illustration of the guiderails, the elevator machine and the first and the second guiderail mounts of FIG. 10.

FIGS. 10 and 11 illustrate an alternative embodiment second guiderail mount 152. In contrast to the second guiderail mount 144 illustrated in FIG. 9, the second guiderail mount 152 includes one or more fasteners 154 that directly connect the car guiderail 30 to a tab 156 (e.g., a flange) located at the bottom frame side 62. The tab 156 may be configured as part of the frame 46 as illustrated in FIG. 10. Alternatively, the second guiderail mount 152 may include the fasteners 154 and the tab 156, where the tab 156 is connected (e.g., mechanically fastened, welded, brazed or otherwise adhered) to the frame 46. Referring again to FIG. 11, a gap 157 extends between the first guiderail mount 142 and the second guiderail mount 152. The second guiderail mount 152 therefore is physically isolated from the first guiderail mount 142 since there is no structure in this embodiment tying the mounts 142 and 152 together other than the guiderails 30 and 36.

In some embodiments, for example as illustrated in FIG. 10, one or more of the counterweight guiderails 34 and 36 may be connected to the car guiderail 30 with an inter-guiderail mount 158. The inter-guiderail mount 158 includes a beam 160 that extends laterally between a plurality of mounting brackets 162. A central region 164 of the beam 160 is connected to the car guiderail 30. The mounting brackets 162 respectively extend between and connect the counterweight guiderails 34 and 36 to end regions 166 of the beam 160. The present invention, however, is not limited to any particular inter-guiderail mount configurations.

Figure 12:
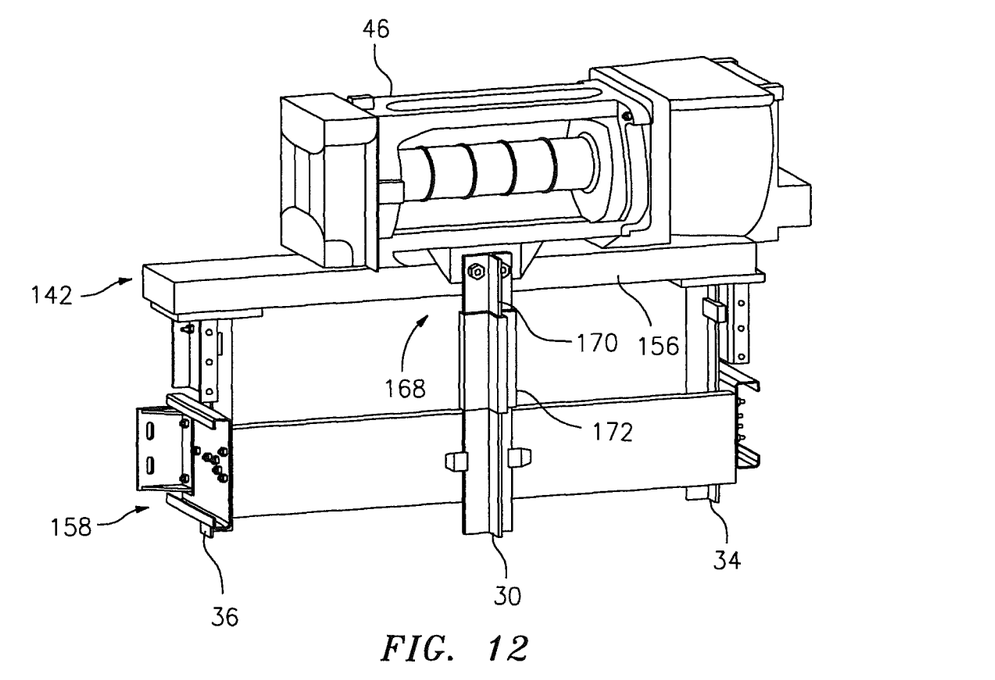
FIG. 12 is another diagrammatic illustration of a first guiderail mount connecting an elevator machine to counterweight guiderails, and a second guiderail mount independently connecting the elevator machine to a car guiderail.
Figure 13:
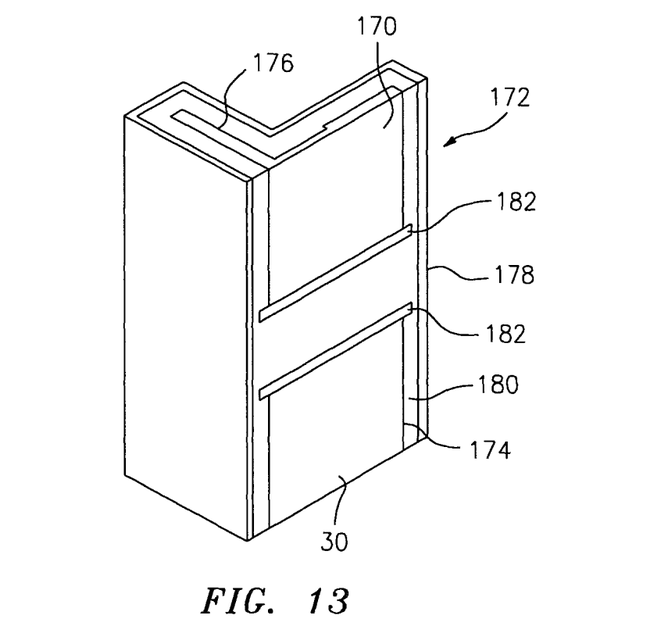
FIG. 13 is a sectional perspective illustration of a linkage connecting a rail to a car guiderail.

FIG. 12 illustrates an alternative embodiment second guiderail mount 168. In contrast to the second guiderail mount 152 illustrated in FIG. 10, the second guiderail mount 168 includes a rail 170 and a linkage 172 (e.g., a rail sleeve). One end of the rail 170 is connected to the tab 156. An opposite end of the rail 170 is connected to an end of the car guiderail 30 with the linkage 172. For example, as illustrated in FIG. 13, the linkage 172 includes a (e.g., T-shaped) first aperture 174 into which a portion of the car guiderail 30 extends, and a (e.g., T-shaped) second aperture 176 into which a portion of the rail 170 extends.

In some embodiments, the linkage 172 may include an outer shell 178 (e.g., metal shell) that houses and supports an isolation sleeve 180 such as, for example, an elastomer (e.g., polyurethane) or rubber isolation pad. The isolation sleeve 180 defines the first and the second apertures 174 and 176, and is adapted to reduce or prevent the transmission of vibrations between the car guiderail 30 from the rail 170. The linkage 172 may also include one or more plates 182 (e.g., metal plates) that support the ends of the rails 30 and 170 within the isolation sleeve 180. The plates 182 are separated from one another by a portion of the isolation sleeve 180. The present invention, however, is not limited to any particular linkage types and/or configurations.

Figure 14:
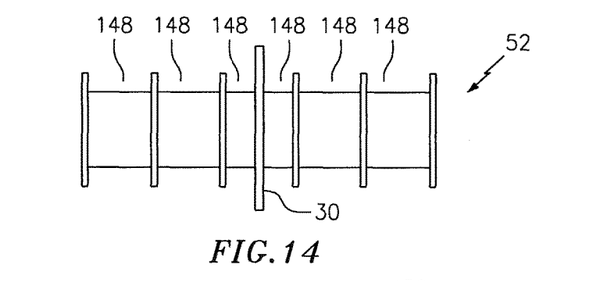
FIG. 14 is a diagrammatic illustration of a machine sheave and a car guiderail.
Figure 15:
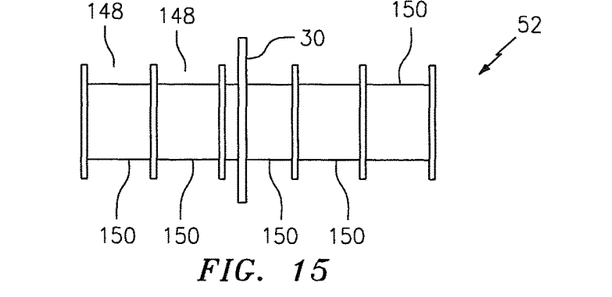
FIG. 15 is another diagrammatic illustration of a machine sheave and a car guiderail.

Referring to FIGS. 14 and 15, the machine sheave 52 includes one or more tension member grooves 148. The machine sheave 52 may be configured as a unitary body as illustrated in FIG. 10. Alternatively, the machine sheave 52 may include a plurality of discrete sheave segments 150 that are connected (e.g., mechanically fastened, welded or otherwise adhered) together. A lateral center (or centroid) of the machine sheave 52 may be laterally aligned with the car guiderail 30 as illustrated in FIG. 14. Alternatively, the lateral center of the machine sheave 52 may be laterally offset from the car guiderail 30 as illustrated in FIG. 15.

A person of skill in the art will recognize the first and/or the second guiderail mounts may have various alternative configurations and/or elements other than those described above and illustrated in the drawings while still providing independent load paths between (i) the frame and the counterweight guiderails and (ii) the frame and the car guiderail. The present invention therefore is not limited to any particular first and/or second guiderail mount configurations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:
1. An elevator system, comprising:
 a car guiderail, a first counterweight guiderail and a second counterweight guiderail spaced from the first counterweight guiderail in a lateral direction, the car guiderail located between the first counterweight guiderail and the second counterweight guiderail in the lateral direction;
 an elevator machine including a frame, a motor, a brake and a sheave;
 a first guiderail mount structurally connecting the frame to the first and the second counterweight guiderails, the first guiderail mount structurally connected to the frame at a connection point located laterally between the motor and the brake; and
 a second guiderail mount structurally connecting the frame to the car guiderail independent of the first guiderail mount.

2. The elevator system of claim 1, wherein the first guiderail mount is connected to a first side of the frame, and the second guiderail mount is connected to a second side of the frame.

3. The elevator system of claim 1, wherein the frame extends between and separates the first and the second guiderail mounts.

4. The elevator system of claim 1, wherein
the first guiderail mount includes a beam extending laterally between a first beam end and a second beam end; and
the beam is connected to the first counterweight guiderail at the first beam end, to the second counterweight guiderail at the second beam end, and to the frame between the first and the second beam ends.

5. The elevator system of claim 4, wherein
the beam includes a bridge segment extending laterally between a first extension segment and a second extension segment;
the first extension segment is arranged at the first beam end and connects the first counterweight guiderail to the bridge segment; and
the second extension segment is arranged at the second beam end and connects the second counterweight guiderail to the bridge segment.

6. The elevator system of claim 4, wherein the beam is configured as a unitary body.

7. The elevator system of claim 4, wherein the first guiderail mount further includes a first mounting bracket that connects the first counterweight guiderail to the first beam end, and a second mounting bracket that connects the second counterweight guiderail to the second beam end.

8. The elevator system of claim 4, wherein
the first guiderail mount further includes one or more dampers disposed between the beam and the frame; and/or
the second guiderail mount includes one or more dampers disposed between the car guiderail and the frame.

9. The elevator system of claim 4, further comprising one or more tension member terminations connected to the beam laterally between the first and the second beam ends.

10. The elevator system of claim 1, wherein
the frame extends laterally between a first frame end and a second frame end;
the second guiderail mount includes a first mount leg and a second mount leg;
the first mount leg extends vertically and laterally away from the car guiderail to a first mount leg end that is connected to the first frame end; and
the second mount leg extends vertically and laterally away from the car guiderail to a second mount leg end that is connected to the second frame end.

11. The elevator system of claim 10, wherein
the frame houses a first sheave bearing at the first frame end and a second sheave bearing at the second frame end; and
the first mount leg transfers a vertical load between the car guiderail and the first sheave bearing, and the second mount leg transfers a vertical load between the car guiderail and the second sheave bearing.

12. The elevator system of claim 1, wherein the second guiderail mount includes a tab that connects the car guiderail to the frame.

13. The elevator system of claim 1, wherein the second guiderail mount includes a rail that connects an end of the car guiderail to the frame.

14. The elevator system of claim 1, wherein the second guiderail mount further includes a linkage that connects an end of the rail to the end of the car guiderail, and the linkage at least partially reduces transmission of vibrations between the rail and the car guiderail.

15. The elevator system of claim 14, wherein
the linkage includes an outer shell and an isolation sleeve;
the outer shell houses and supports the isolation sleeve; and
the isolation sleeve includes a first aperture that receives the end of the rail, and a second aperture that receives the end of the car guiderail.

16. The elevator system of claim 1, wherein
the frame extends laterally between a first frame end and a second frame end;
the brake is connected to the first frame end;
the motor is connected to the second frame end; and
the sheave extends laterally through the frame between the motor and the brake.

17. The elevator system of claim 1, wherein the sheave is configured as a unitary body, and includes a plurality of tension member grooves.

18. The elevator system of claim 1, further comprising an elevator car, wherein the car guiderail is positioned between the elevator car and the first and the second counterweight guiderails.

19. An elevator system, comprising:
a car guiderail, a first counterweight guiderail and a second counterweight guiderail;
an elevator machine including a frame, a motor, a brake and a sheave;
a first guiderail mount structurally connecting the frame to the first and the second counterweight guiderails, the first guiderail mount structurally connected to the frame at connection points located laterally between the motor and the brake; and
a second guiderail mount structurally connecting the frame to the car guiderail independent of the first guiderail mount;
wherein the second guiderail mount includes a mount cross member and a mount leg;
wherein the mount cross member extends laterally between a first cross member end that is connected to a first end of the frame, and a second cross member end that is connected to a second end of the frame; and
wherein the mount leg extends vertically between a first leg end that is connected to the car guiderail, and a second leg end that is connected to the mount cross member laterally between the first and the second cross member ends.

20. An elevator system, comprising:
a car guiderail, a first counterweight guiderail and a second counterweight guiderail spaced from the first counterweight guiderail in a lateral direction, the car guiderail located between the first counterweight guiderail and the second counterweight guiderail in the lateral direction;
an elevator machine including a frame, a motor, a brake and a sheave;
a first guiderail mount structurally connecting the frame to the first and the second counterweight guiderails; and
a second guiderail mount structurally connecting the frame to the car guiderail independent of the first guiderail mount;
wherein a lateral center of the sheave is laterally offset from the car guiderail.

21. A system for an elevator having a car guiderail, a first counterweight guiderail and a second counterweight guiderail, the system comprising:
- an elevator machine including a frame, a motor, a brake and a sheave;
- a first guiderail mount connected to a first side of the frame laterally between the motor and the brake, and adapted to structurally connect the frame to the first and the second counterweight guiderails; and
- a second guiderail mount connected to a second side of the frame, and adapted to structurally connect the frame to the car guiderail independent of the first guiderail mount
- wherein the second guiderail mount includes a mount cross member and a mount leg;
- wherein the mount cross member extends laterally between a first cross member end that is connected to a first end of the frame, and a second cross member end that is connected to a second end of the frame; and
- wherein the mount leg extends vertically between a first leg end that is connected to the car guiderail, and a second leg end that is connected to the mount cross member laterally between the first and the second cross member ends.

22. An elevator system, comprising:

a car guiderail and a plurality of counterweight guiderails;

an elevator machine including a frame, a motor, a brake and a sheave;

a first guiderail mount connecting the frame to the counterweight guiderails, wherein the first guiderail mount is connected to the frame via a connection located laterally in between the motor and the brake; and a second guiderail mount connecting the frame to the car guiderail, wherein the second guiderail mount is physically isolated from the first guiderail mount.

* * * * *